United States Patent [19]

Waaske

[11] 4,154,519
[45] May 15, 1979

[54] PHOTOGRAPHIC CAMERA

[75] Inventor: Heinz Waaske, Braunschweig-Mascherode, Fed. Rep. of Germany

[73] Assignee: Rollei-Werke Franke & Heidecke, Braunschweig, Fed. Rep. of Germany

[21] Appl. No.: 800,053

[22] Filed: May 24, 1977

[30] Foreign Application Priority Data

May 28, 1976 [DE] Fed. Rep. of Germany ....... 2623947

[51] Int. Cl.² .............................................. G03B 13/02
[52] U.S. Cl. .................................... 354/206; 354/213; 354/288
[58] Field of Search ............... 354/202, 204, 206, 212, 354/213, 288

[56] References Cited

U.S. PATENT DOCUMENTS

| 3,153,375 | 10/1964 | Zapp | 354/204 |
| 4,012,754 | 3/1977 | Waaske | 354/212 |
| 4,032,940 | 6/1977 | Chan | 354/204 |

*Primary Examiner*—Russell E. Adams
*Attorney, Agent, or Firm*—Stonebraker, Shepard & Stephens

[57] ABSTRACT

A sub-miniature photographic camera with a housing elongated in a direction transverse to the optical axis, and having a lens window opening and a viewfinder window opening in the front edge of the housing, spaced from each other in the direction of elongation of the housing. A cover plate or blind plate is slidable within the housing from a position closing both openings to a position uncovering both openings. A manually operable member slidable on the housing in a direction transverse to the optical axis serves simultaneously to initiate movement of the cover plate to an open position, and to wind the film, and to tension or cock the shutter operating mechanism ready for making an exposure. After the film winding and shutter tensioning movement of the manually operable member, if the operator decides not to take a picture right away and therefore moves the manually operable member back to its initial position in order to move the cover plate to its closure position, the manually operable member becomes automatically disconnected from the film feeding parts, so that it will not cause further film feeding movement if the manually operable member is again moved in a film feeding direction in order to shift the cover plate to an open or picture-taking position, when the operator is ready to make an exposure.

14 Claims, 7 Drawing Figures

PHOTOGRAPHIC CAMERA

BACKGROUND OF THE INVENTION

This invention relates to a photographic camera, especially a very small camera of the kind often called a sub-miniature camera, having a handle or manually operated member which is movable from a basic rest position in a direction transversely of the optical axis of the camera, for the purpose of winding the film and tensioning or cocking the shutter. This handle or manually operable member is operatively connected with a rack which is displaceable in the same direction, and which drives a film winding shaft directly or indirectly. In addition, there is a cover plate or blind plate coupled with the manually operable handle for covering and clearing the camera lens or the camera viewfinder or both.

In known cameras of this kind, the camera housing is made in two parts telescopically extensible and retractable relative to each other, in a direction transversely of the optical axis. The function of the cover plate for covering or uncovering the lens opening is here taken over by the telescopically movable part of the camera housing. Secured to this movable part of the housing is a rack which actuates the shutter tensioning or cocking mechanism and also, through a gearing, operates the film winding shaft. This gearing (in the known camera being discussed) is formed as differential gearing, especially as planet wheel gearing, so designed as to permit uncoupling the film winding shaft from the gearing when the film has been fed to proper position, so that the rack in engagement with the gearing is freely movable after the film has been properly fed. With this arrangement, the camera can again be opened out or closed up as desired, without causing further winding of the film or displacement thereof.

Such planet wheel gearing, as used in the prior camera mentioned, not only is expensive to manufacture, but also takes up considerable space, if the gearing is designed and constructed in an operationally reliable manner. These factors make such gearing unsuitable for use in very small cameras with a minimum cross section which is, for example, only very slightly greater than the cross section of the film chamber of an ordinary commercial film cassette of the 110 size.

The present invention is based on the problem of producing satisfactory and reliable gearing for the film winding and shutter tensioning operations, in a form which is quite shallow and space-saving, suitable for use in a camera with minimum cross-section dimensions, in which in the usual way the camera lens and camera viewfinder can be covered and cleared or uncovered as desired, independently of the film winding and shutter tensioning operations, by actuation of the drive element for the gearing. Furthermore, the invention takes into account the fact that such gearing must be able to be produced in an economical or cost-saving manner.

According to the present invention, this problem is solved by providing, in a camera otherwise of the kind above described, a connection between the handle or manually operable member, and the rack, which connection is automatically eliminated or rendered inoperative in the basic or rest position of the handle after a film winding operation has taken place if the shutter release has not taken place.

According to a further development of the invention, for this purpose the rack is guided for longitudinal displacement, and in the basic or rest position of the handle, the rack is swingable about a pivot point. The handle is operatively connected to the rack in a shape locking or form locking manner, for longitudinal movement with each other, and this operative connection can be disconnected or rendered inoperative by pivoting or swinging the rack about its pivot point.

In a preferred embodiment of the invention, the pivot of the rack is at one end of the elongated rack, and there is a recess or notch at the other end of the rack. A hooklike projection on the handle member or manually operable member extends into this notch in the rack when the handle and the rack are operatively connected, and the hook on the handle is not engaged in the notch of the rack when the rack is pivoted to its disengaged position.

According to a further development of the invention, the swinging of the rack on its pivot is brought about by a device which is controlled by a feeler lever which is responsive to the position of the film. In a camera designed for use with perforated film, where the perforation intervals correspond to one picture step or "frame," the rack pivoting device is normally in an inoperative position, and is moved into its operative position by the dropping of the feeler lever into a film perforation, thereby rendering the rack pivoting device operative to swing the rack to disconnect it from the manually operable handle. When the shutter release is operated to make an exposure, this lifts the feeler lever out of the perforation in the film, thus rendering the rack pivoting device inoperative again so that the rack again becomes operatively connected to the manually operable handle. Thus during the time interval between the completion of the film winding operation and the actuation of the shutter release, the rack which serves to drive the film winding operation and to tension the shutter remains operatively disconnected from the manually movable handle, which means that during this time interval the handle may be moved back and forth as often as desired, to close or to open the lens window and the viewfinder window, without causing any further movement of or damage to the film or the shutter tensioning mechanism.

The design according to the present invention has the important advantage that all gearing parts such as the rack, the manually movable handle, the rack pivoting device, and all individual elements and feeler levers, can be produced with the requisite precision from synthetic plastic material, considerably reducing the manufacturing cost thereof.

DESCRIPTION OF THE PREFERRED EMBODIMENT

Figure 1:
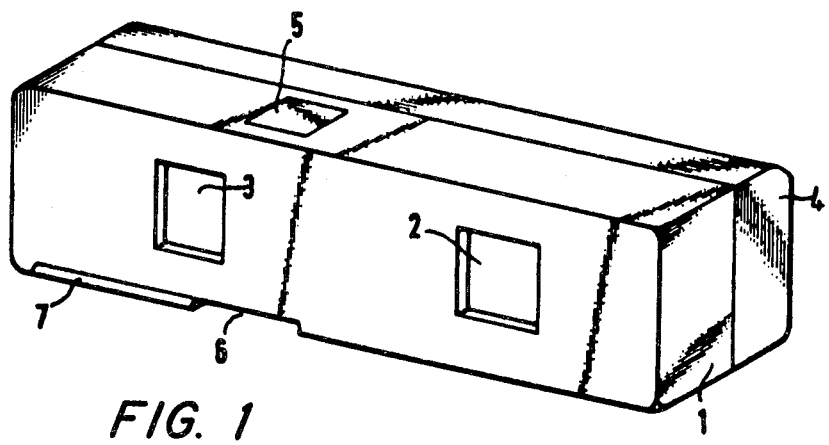
FIG. 1 is a perspective view of a camera in accordance with a preferred embodiment of the invention.

The camera in its preferred form comprises a housing or body formed by a front cap 1, having a viewfinder window 2 and a lens window 3, and a rear housing cap 4 fitting against the front housing cap 1, to complete the housing. The rear cap 4 has an opening (not shown) for viewing the scene through the viewfinder. A release knob or plunger 5 arranged preferably on the top wall of the front housing cap 1 serves, when depressed, to release or activate the shutter mechanism, to make an exposure.

Figure 2:
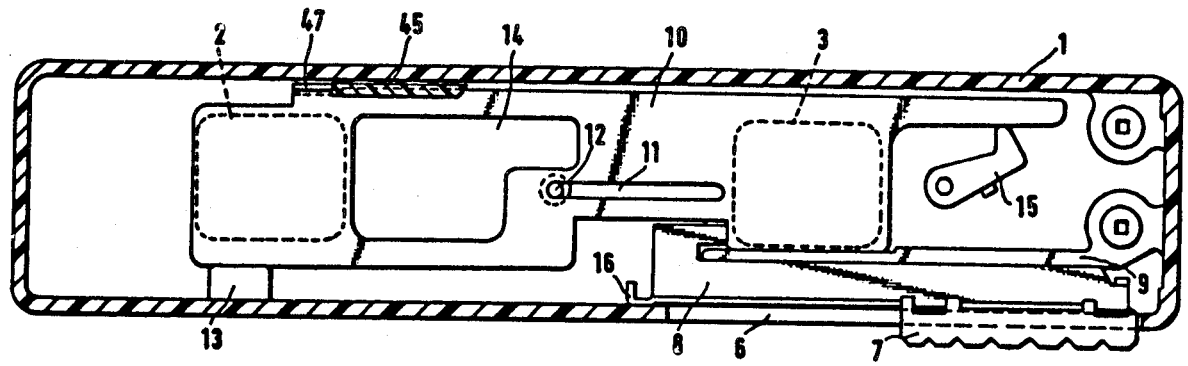
FIG. 2 is an internal view of the forward housing cap or part of the camera of FIG. 1, with the cover plate (for covering an uncovering the lens window and the viewfinder window) and the manually operable handle in place, and many other parts omitted.

It will be noted from FIG. 1 that the camera housing or body is elongated in a direction transverse to the optical axis, which axis extends, of course, through the lens window 3. The housing cap 1 has a slot 6 elongated in the same direction (that is, in a direction transverse to the optical axis), preferably located at the forward lower edge of the housing. In this slot 6 a manually operable handle 7 is arranged for displacement transversely of the optical axis. The basic or rest position of the handle 7 is at the extreme right hand end of the slot 6, as shown in FIGS. 1 and 2, the directions right and left having reference to the camera when viewed from behind, as normally held in front of the eye of the user of the camera, and FIGS. 2–7 of the drawings will refer to the directions in this sense. In FIG. 1, viewing the camera from the front, these directions are reversed, of course.

This manually operable handle 7 is rigidly connected with a slider member 8 (FIG. 2) which moves left and right with the handle 7, and which is guided partly on a stationary rail 9 secured in the interior of the housing cap, and partly on the bottom wall of the housing cap. The slider 8 is connected by a lost motion connection with a cover plate or blind plate 10 which slides rightwardly and leftwardly just behind the front wall of the housing, serving in its basic rightward position (illustrated in FIG. 2) to cover or close the viewfinder opening 2 in the front wall, and the lens opening 3 in the same wall, to prevent entrance of dirt and foreign objects. This cover plate is guided partly by a slot 11 in the plate engaging a fixed pin 12 secured in the housing cap, and partly by a slide guide piece 13 secured on the bottom wall of the housing cap. When the cover plate 10 is moved leftward to its limit position, an opening 14 in the plate uncovers the viewfinder window 2, and the right end of the plate moves past and uncovers the lens window 3.

As above mentioned, the handle 7 and slider 8 have a lost motion connection with the cover plate 10. After leftward motion of the handle 7 and slider 8 has moved the plate 10 leftwardly through part of its travel, the spring loaded lever 15 takes over and completes the leftward movement of the plate to its limit position, independently of whether or not the slider 8 continues its leftward travel. This is for the purpose fully explained in Waaske U.S. Pat. No. 4,012,754, granted Mar. 15, 1977. By pushing the handle 7 rightward to its limit position, the cover plate 10 is pulled back by the slider 8 to its basic covering position illustrated in FIG. 2.

At the left end of the slider 8 there is a hook or lug 16 (FIGS. 2 and 3) extending upwardly, perpendicular to the direction of movement of the slider. Under certain conditions, this hook 16 engages in a notch or recess 17 (FIG. 3) near the right hand end of the bottom edge of a rack member 18. This rack 18 is pivoted near its left end on a pivot 19 which extends in a direction parallel to the optical axis, and which slides transversely of the optical axis in a groove or slot 20 formed in a plate 21 arranged to the rear of the cover plate 10. The expressions front and rear, in describing the camera, are intended to refer to the direction of the scene being photographed as the front direction, and the direction toward the person holding the camera in front of him as being the rear direction. This plate 21 has two apertures 22 and 23 aligned with the openings 2 and 3 in the housing.

Near the right hand end of the rack member 18, this member carries a dog or projection in the form of a pin 24 projecting forwardly in a direction parallel to the axis of the pivot pin 19, that is, in a direction parallel to the optical axis. This pin 24 is guided in another slot 25 in the plate 21. This slot 25, at its right hand end, is widened in a direction perpendicular to the direction of displacement of the rack and slider, in such a way that when the rack and slider are at their right hand limit positions, the pin 24 can rise into the widened part of the slot 25, so that the right end of the rack can rise high enough to disengage the notch 17 of the rack from the hook 16 of the slider, thus rendering the connection between the slider and the rack inoperative. But whenever the rack is moved leftwardly from its extreme right position, then the control pin 24 on the rack is in the narrow part of the slot 25, and the rack cannot rise, so the connection between the slider and the rack remains operative.

Figure 3:
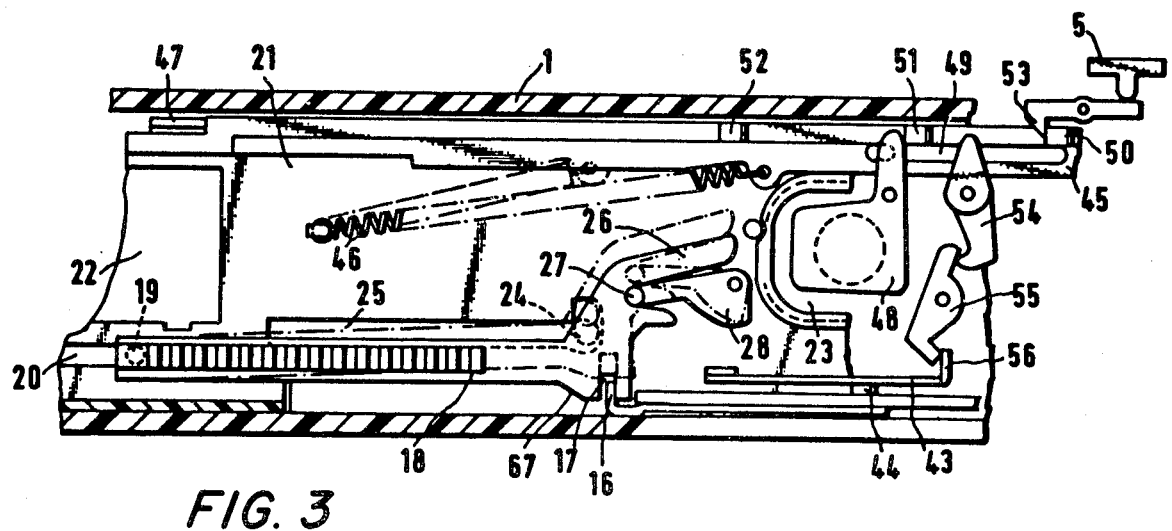
FIG. 3 is a view similar to a fragment of FIG. 2, on a larger scale, with additional parts in place.

At the right hand end, the rack member 18 has a fork shaped or bifurcated extension piece 26, with an angular slot between the arms thereof, narrow at the left end of this slot and widening in a rightward direction, as illustrated in FIG. 3. During rightward movement of the rack member 18, as it approaches the right hand limit of its travel, the forked parts grasp around the pin 27 secured on an arm 28 pivotally mounted on the stationary plate 21. This arm 28 forms part of a rack pivoting device indicated in general at 29 and illustrated on an enlarged scale in FIGS. 4 and 5, to which reference is now made.

Figure 5:
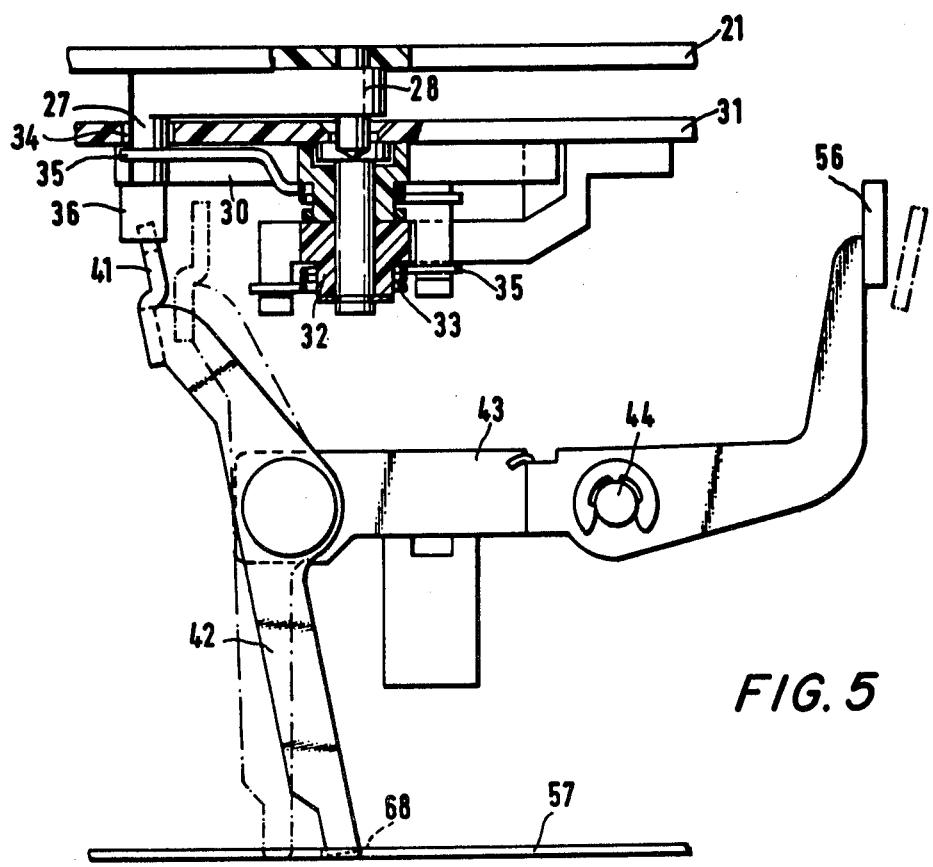
FIG. 5 is a horizontal plan view, partly in horizontal section, of certain of the parts shown in FIG. 4, with some parts omitted.

This rack pivoting device comprises a bellcrank lever 30 pivotally mounted on a stationary plate 31 which lies to the rear of the stationary plate 21. On the same pivot of this bellcrank lever 30 there is also a pivoted lever 32 which acts through a loop spring 33 on the bellcrank lever. The previously mentioned pivoted lever 28 lies between the two plates 21 and 31 as seen in FIG. 5, and the plate 31 has an aperture 34 through which the pin 27 on the arm 28 extends. This aperture 34 is of such size that the pivot arm 28 can swing to the necessary extent.

The bellcrank lever 30 bears against this pin 27, tending to press it upwardly, under the influence of a further loop spring 35. The same arm of the bellcrank lever which presses upwardly against the pin 27 has a rearward extention or lug 36 which engages under a shoulder or abutment at the top of a recess 37 on a further pivoted lever 38 which is pivotally mounted on the plate 31 and which is held in its position of engagement with the bellcrank lever 30 under the action of a loop spring 39. This pivot lever 38 carries at its lower end a projection 40 adapted to engage an arm 41 at the forward end of a pivoted feeler lever 42, the rear end of which engages the photographic film (shown at 57 in FIG. 5) and is adapted to drop into a perforation 68 of the film when the film travels far enough to bring the perforation 68 to the end of the feeler lever. This feeler lever is pivotally mounted at an intermediate point on one end of the two armed lever 43 which, in turn, is pivoted on the fixed pivot point 44.

There is a shutter driving or operating member in the form of a slide 45 (FIGS. 2 and 3) which slides leftwardly and rightwardly in a direction transverse to the optical axis. This operating slide 45 is guided on a pin and slot connection indicated in general at 49. The cover plate 10 has an arm 47 which, during rightward movement of the cover plate to its covering or closing position, engages an abutment on the operating slide 45 and moves this slide to its rightward position, thereby tensioning the main spring or master spring 46 which tends to pull the slide 45 leftwardly. The shutter operating slide 45 carries three dogs or projections 50, 51, and 52. The member 45 is latched in its tensioned or extreme right position by a pivoted latch 53 which engages the dog 50 and which can be released by pressure on the release member or plunger 5. When release occurs, the spring 46 pulls the slide 45 leftwardly and the dog or projection 51 strikes against the projecting tail of the pivoted shutter blade 48 and moves this shutter blade momentarily to a position clearing the exposure aperture, so that light may enter and fall on the film 57 to make an exposure. In the present example, the shutter is illustrated as a single blade shutter, but the details of the shutter mechanism are not important for purposes of the present invention, so long as it is so designed as to be operated by the leftward movement of the dog 51, and so the shutter is capable of wide variation within the skill of the art.

A two armed lever 54 (FIG. 3) mounted on a stationary pivot has one arm projecting into the path of travel of the dog 50 on the slide 45, so that as this slide moves leftwardly, the dog 50 will move the lever 54 in a counterclockwise direction, moving the other arm thereof away from the companion lever 55 so that no action occurs on the lever 55. However, when the shutter operating slide 45 is restored rightwardly, from its leftward or run-down position to its rightward or tensioned position (by the action of the arm 47 on the cover plate 10, pulled rightwardly by the handle 7) then during such rightward movement the dog 50 on the slide 45 will engage the upstanding arm of the lever 54, turn this lever in a clockwise direction, so that the other arm thereof will engage the upper arm of a second two-armed lever 55 mounted on a stationary pivot and move this second lever in a counterclockwise direction. Thereby the lower end of this second lever 55 will engage an upstanding lug 56 (FIGS. 3 and 5) on one end of the mounting lever 43 on which the feeler lever 42 is mounted. This will move the lug 56 of the lever 43 to the dot-dash line position shown in FIG. 5, thereby swinging the lever 43 in a clockwise direction on its pivot 44, and shifting the feeler lever 42 out of the perforation 68 in the film 57.

Figure 6:
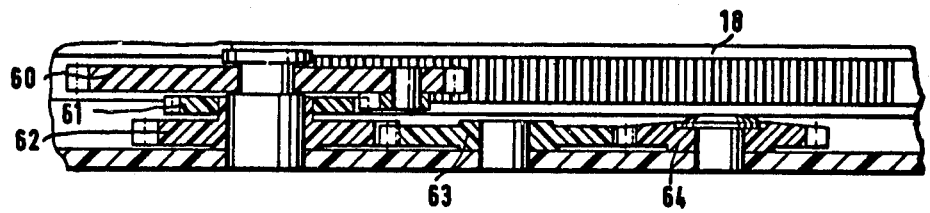
FIG. 6 is an enlarged vertical section through the film winding gearing which is driven by the rack shown in FIG. 3.
Figure 7:
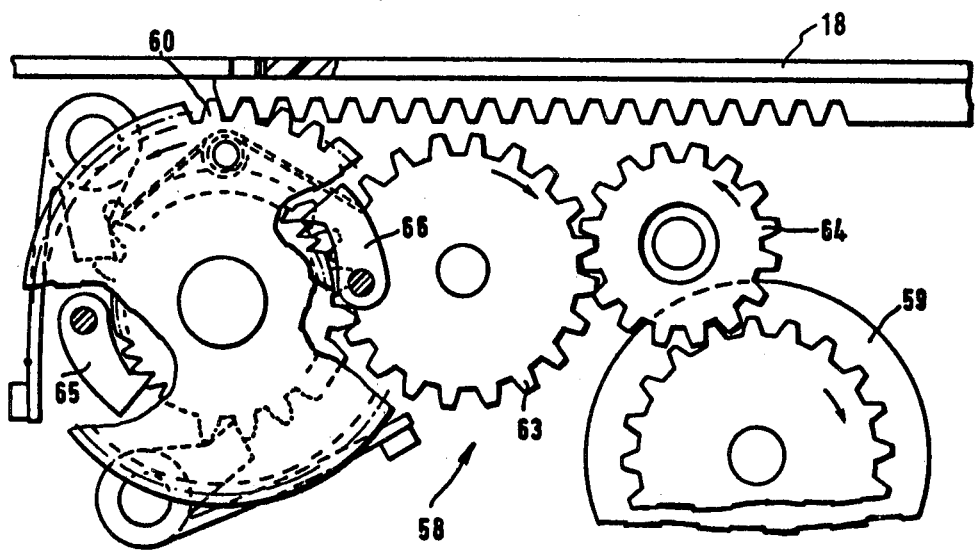
FIG. 7 is a plan view, with parts broken away, of the gearing shown in FIG. 6.

For winding the film from the motion of the rack member 18, there is a free wheel gearing arrangement indicated in general at 58 in FIG. 7, and shown also in FIG. 6. The gear teeth of the rack 18 mesh with and drive a first toothed wheel or gear 60. Rotatable on the same shaft as the gear 60 there is a toothed ratchet wheel 61 fixed to the hub of a toothed gear 62 which in turn meshes with the teeth of an intermediate gear 63. This gear 63 meshes with a second intermediate or idler gear 64 which meshes with the gear 59 on the take-up spool shaft. Two pawls 65 and 66 pivotally mounted on the underside of the first gear 60 engage the teeth of the ratchet gear 61 and drive this ratchet gear and its connected gear 62 in a counterclockwise direction when the rack 18 moves leftwardly, but simply ratchet idly over the teeth of the gear 61 during rightward movement of the rack 18 and clockwise rotation of the first gear 60. In this way, the film feeding or take-up gear 59 is turned to feed the film whenever the rack member 18 moves leftwardly, but is not affected when the rack member moves rightwardly.

The operation in general will be apparent from what has been said above, but may be described in more detail as follows.

Let it be assumed that the manually operable handle is in its basic or right hand position, with the cover plate or blind plate 10 covering and obstructing the viewfinder window 2 and the lens window 3, and that the rack is in operative engagement with the hook 16 on the slider 8, and that the shutter drive slider 45 is latched in its cocked or tensioned position by the latch 53, all these parts being as illustrated in full lines in FIGS. 2 and 3. It is also assumed that the film has not yet been fed after the previous exposure was made, so it must be fed before making the next exposure. The feeler lever 42 has been lifted out of the perforation in the film as a result of the last previous exposure, and now rests idly on the surface of the film, not in an opening or perforation.

Now the handle 7 is shifted to the left in FIG. 2, thereby moving with it the slide 8 and the rack member 18. The leftward movement of the rack 18 rotates the gear wheel 60, and through the other gearing described, including the idler gears 63 and 64, the film take-up shaft is rotated and the film is fed.

At the same time, after a short idle stroke, the slider 8 engages a portion of the cover plate 10 and begins to move the cover plate leftwardly. After a short movement thereof, the spring pressed lever 15 becomes operative and completes the leftward movement of the cover plate 10, just as described in the above mentioned U.S. Pat. No. 4,012,754, where the lever 16 in that patent corresponds to the lever 15 of the present application, and the cover plate 6 of that patent corresponds to the cover plate 10 the present application. Thereby the cover plate is moved to the leftward limit of its travel, uncovering the viewfinder window 2 and the lens window 3.

Shortly before the completion of the winding of the film through the distance of one picture area or frame, the feeler lever 42 drops into the perforation 68 of the film strip 57 and the motion of the film strip swings this feeler lever 42 from the full line position to the dot-dash line position shown in FIG. 5. Thus further winding of the film is blocked and the leftward motion of the manually operated handle 7 stops, even though the handle may not have reached its extreme leftward position. This does not matter, because the spring pressed lever 15 has seen to it that the cover plate 10 has moved all the way to its left or open position, even if the handle 7 has not moved through its complete maximum stroke. As successive exposures are made from the same film strip and more and more film is successively wound on the take-up spool, shorter and shorter strokes of the handle 7 will be sufficient to feed a full frame length of the film, and that is why the auxillary drive lever 15 is provided, as explained in the above mentioned patent, to make sure that the cover plate reaches its fully open position even when the handle 7 requires only a short stroke for the necessary film winding.

Figure 4:
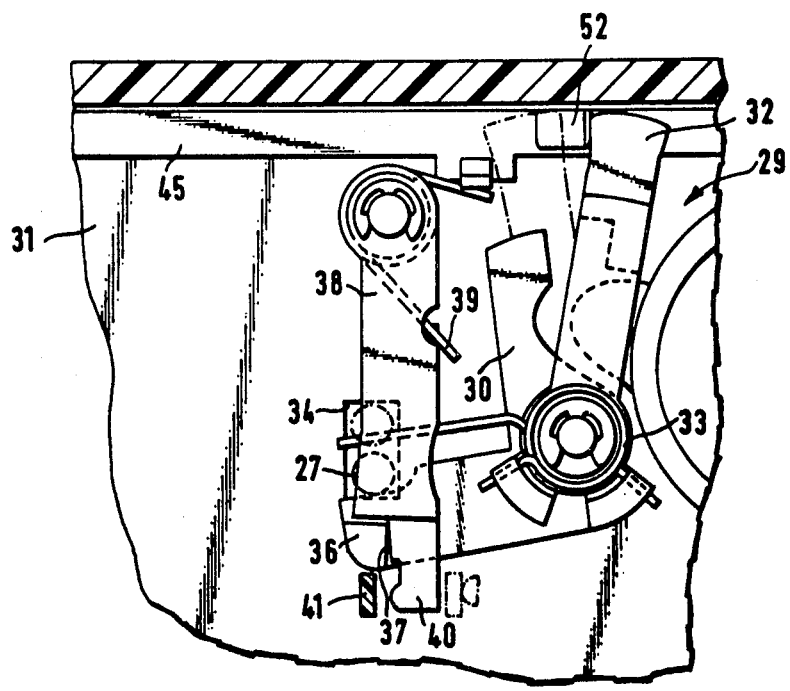
FIG. 4 is a similar view on a still larger scale, illustrating certain details of the rack pivoting device which is only partially visible in FIG. 3.

When the feeler lever 42 is moved by the feeding motion of the film to its dot-dash line position of the FIG. 5, as above described, then the arm 41 of this feeler lever engages the lower end of the lever 40, and shifts this lever counterclockwise, against the force of its spring 39, to bring the lever 41 and the lower end of the lever 38 to the position shown in dot-dash lines in FIG. 4. Thereby the abutment part of the lever 38 which overlies the lug 36 on the bellcrank lever 30, is moved aside, and the spring of the bellcrank lever can now turn this bellcrank lever slightly clockwise, so that it presses upwardly on the pin 27 of the pivot arm 28 and turns this pivot arm slightly clockwise on its pivot. This clockwise motion of the bellcrank lever 30 is possible at this time because at this time the lug 52 on the shutter slide member 45 is holding the lever 32 in its clockwise or full line position shown in FIG. 4, and this lever 32 does not interfere with the necessary limited clockwise movement of the bellcrank lever 30.

The camera is now ready for an exposure, and an exposure can be made if desired. However, let us suppose that the photographer, after feeding the film and tensioning the shutter as above described, now decides that he does not wish to make an exposure immediately, but on the contrary, wishes to move the cover plate back to its right hand position, closing the viewfinder opening 2 and lens opening 3. Therefore, the operator now moves the manually operable handle 7 rightwardly to its limit of motion, to the position shown in FIG. 2. During this movement, the slider 8 entrains the cover plate 10 and moves it to its fully closed position. At the same time, the hook 16, engaged in the notch 17 of the rack member 18, pulls the rack 18 to its right hand position. The rightward movement of the rack 18 rotates the film feeding gear wheel 60 in a clockwise direction, but the pawls 65 and 66 simply ratchet harmlessly over the ratchet wheel 61, so that no motion of the gears 63, 64 or 59 results. The rack is thus transferred to its basic or right hand position, without any movement of the film. As the rack approaches its basic position, the fork portion 26 thereof engages over the pin 27, which at this time is in its upper position as shown in dot-dash lines in FIG. 3, on account of being held up by the pressure of the bellcrank lever 30, as above explained. Until the pin 24 on the rack member 10 reaches the wide part of the slot 25, the rack member cannot pivot upwardly, and hence the sloping cam surface of the fork part 26 pulls the pin 27 downwardly, against the action of the upward spring pressure, until the pin 24 reaches the upwardly widened part of the slot 25, just as the rack member reaches the right end of its range of movement. Then, as the pin 24 reaches the upwardly enlarged part of the slot 25, the upward spring pressure on the pin 27 raises the right hand end of the rack member slightly, to the dot-dash line position shown in FIG. 3, pivoting it upwardly on its pivot 19 at the left end of the rack member. This raises the rack member far enough so that the hook 16 on the slider 8 is no longer engaged in the notch 17 of the rack member.

In this way, the handle 7 and slider 8 have been automatically disconnected from the rack member 18. The handle and the connected slider are free to be moved back and forth at will, without causing any movement of the rack member. So whenever the operator is ready to make an exposure, he can move the handle 7 leftwardly to move the cover plate 10 to its open position, without thereby causing any further feeding of the film. By pressing the release knob 5, the latching pawl 53 is lifted, and the shutter slider 45 is liberated to run down in a leftward direction under the influence of the spring 46, thereby operating the shutter to make the exposure.

After the exposure has been made, the shutter slide member 45 is in its left hand position partially shown in dotted lines in FIG. 3. The dog 51 has moved the pivot lever 32 into the position shown in dot-dash lines in FIG. 4, during the running down movement of the slider 45, so that the bellcrank lever has again been shifted counterclockwise by the motion of the lever 32, to the full line position shown in FIG. 4, and the pin 27 is now in its lower position illustrated in FIGS. 3 and 4. The pivot lever 38 is still in the position partly shown in dot-dash lines in FIG. 4, since the arm 41 of the feeler lever 42 still holds it in this position, out of engagement with the bellcrank 30.

In order to make the next exposure, or to transfer the camera again into its condition protecting the lens and viewfinder, the handle 7 must again be moved rightwardly to its basic position illustrated in FIG. 2. The slider here entrains the cover plate 10, and the latter again through its arm 47 entrains the shutter slide member 45, causing rightward movement thereof. During this movement, the dog 50 strikes the lever 54 and pivots it in a clockwise direction, thereby causing counterclockwise pivoting of the associated lever 55, which engages the lug 56 on the feeler mounting lever 43, moving the feeler mounting lever to withdraw the end of the feeler from the perforation in the film. Under the action of a spring (not shown) the feeler lever moves slightly counterclockwise from the position shown in dot-dash lines in FIG. 5 to the position shown in full lines, thereby moving the end 41 away from the lower end 40 of the lever 38, which now moves back to its full line position of FIG. 4, under the influence of its spring 39, thereby overlying and latching the bellcrank lever 30.

Shortly before completion of the rightward movement of the shutter slider 45, the dog 52 strikes the upper end of the pivot lever 32 and swings this lever in a clockwise direction, thereby applying spring pressure tending to move the bellcrank lever 30 in the same clockwise direction, so that it can move in this direction the next time that the feeler lever shifts the pivoted lever 38 to an unlatching position with respect to the bellcrank level. When the shutter slider 45 finally reaches its full right hand position, the latching pawl 53 engages the lug or dog 50 thereon, holding the shutter slider in the tensioned position.

Moreover, during the rightward movement of the handle 7 the slider 8, the hook 16 on the slider 8 slides along the bottom edge ofthe rack member 10 until it comes to the inclined cam surface 67 thereof, and engages this inclined surface to raise the right end of the rack member 18 slightly, and the rack member then drops down onto the hook 16 of the slider when the hook reaches the notch 17 of the rack. Thus the shape-locked or form-locked operative connection between the slider and the rack member is restored and becomes operative.

When the next exposure is to be made, the slider is again shifted from its basic position to the left, whereby the cover plate 10 is again shifted to the open or uncovered position, and at the same time the film is wound if it has not already been wound.

What is claimed is:

1. A photographic camera having an optical axis and comprising a housing and a manually operable handle movable relative to said housing to and from a basic position in a direction transverse to said optical axis, said housing having at least one optical opening for passage of light, a cover plate operatively coupled to said handle for movement between a position covering said optical opening and a position clearing said opening, a shutter, means for releasing said shutter to make an exposure, film winding mechanism, a toothed rack movable for operating said film winding mechanism, an operative connection between said handle and said rack to operate said rack from movement of said handle, the means for automatically rendering said connection inoperative after said film winding mechanism has been operated and before said shutter has been released for the next exposure so that said handle and said cover plate may be freely moved without causing movement of said rock or operation of said film winding mechanism, until the next exposure is made.

2. The invention of claim 1, wherein said rack is guided for longitudinal movement and is pivotally mounted for swinging movement about a pivot point when said handle is in its said basic position.

3. The invention of claim 2, wherein said rack is operatively connected with said handle in one position and is operatively disconnected from said handle by swinging said rack on its pivot point to a different position.

4. The invention of claim 3, wherein said rack has a recess and there is a hook lug firmly connected to said handle and adapted to enter said recess when said rack is in one pivoted position and to be disengaged from said recess when said rack is in another pivoted position.

5. The invention of claim 2, further including a feeler lever responsive to the position of film in the camera, and means controlled by said feeler lever for controlling swinging of said rack on its pivot point.

6. The invention of claim 5, wherein said film is perforated at intervals corresponding to the lengths of successive picture areas, further comprising a device (29) for disconnecting said rack from said handle, means normally holding said device in an inoperative position, and means responsive to the entry of said feeler into one of said perforations for rendering said device operative to disconnect said rack from said handle.

7. The invention of claim 2, further comprising a slot for guiding said pivot point during longitudinal movement of said rack, a projection on said rack at a location spaced from said pivot point, a second slot for receiving and guiding said projection to control the swinging of said rack on its pivot point, and a widened portion at one location of said second slot, so that when said projection is at said widened portion, said rack may swing to a limited extent on its pivot point.

8. The invention of claim 6, wherein said device includes a pin, and said rack includes a fork portion for engaging said pin as said rack moves toward one end of a range of travel, to react with said pin to cause swinging movement of said rack on its pivot point.

9. The invention of claim 8, wherein there is a feeler lever responsive to the position of film, and means controlled by said feeler lever for holding said pin in a inoperative position when film is not positioned ready for an exposure and for releasing said pin for operation when film is properly positioned.

10. The invention of claim 1, wherein said film winding mechanism comprises free wheeling gearing.

11. The invention of claim 5, further comprising a shutter operating slider (45) movable transversely of the optical axis, a drive spring (46) tending to move said slider in one direction, and means (47) operated by movement of said cover plate (10) for moving said slider against the force of said drive spring.

12. The invention of claim 11, comprising lever means (54, 55, 43) operated by movement of said shutter slider in a spring tensioning direction for moving said feeler lever (42) relative to the film.

13. The invention of claim 11, further comprising a plurality of dogs (51, 52) on said shutter slider, a pivot lever (32) operated by one of said dogs, a bellcrank lever (30) controlled in part by said bellcrank lever, and means operated by said bellcrank lever for influencing swinging movement of said rack.

14. A photographic camera having an optical axis and comprising a housing and a manually operable handle movable relative to said housing to and from a basic position in a direction transverse to said optical axis, said housing having at least one optical opening for passage of light, a cover plate operatively coupled to said handle for movement between a position covering said optical opening and a position clearing said opening, a shutter, means for shifting said shutter to a cocked position ready for an exposure, means for releasing said cocked shutter to make an exposure, film winding mechanism, feeler means for feeling the position of film in the camera, said feeler means having a first position allowing a film feeding movement and a second position blocking further film feeding movement after one picture area of unexposed film is placed in a film gate of the camera, a toothed rack movable for operating said film winding mechanism, an operative connection between said handle and said rack to operate said rack from movement of said handle, a device for disconnecting said rack from said handle, means normally holding said device in an inoperative position, and means responsive to said feeler means and said shutter shifting means for releasing said device holding means when said feeler means is in said second position and said shutter is cocked, said device being set in a position to disconnect said rack from said handle when said handle returns to said basic position, so that said handle may thereafter be moved without causing longitudinal movement of said rack.

* * * * *